J. MURRAY.
Corn Sheller.
No. 4,805.
Patented Oct. 7, 1846.
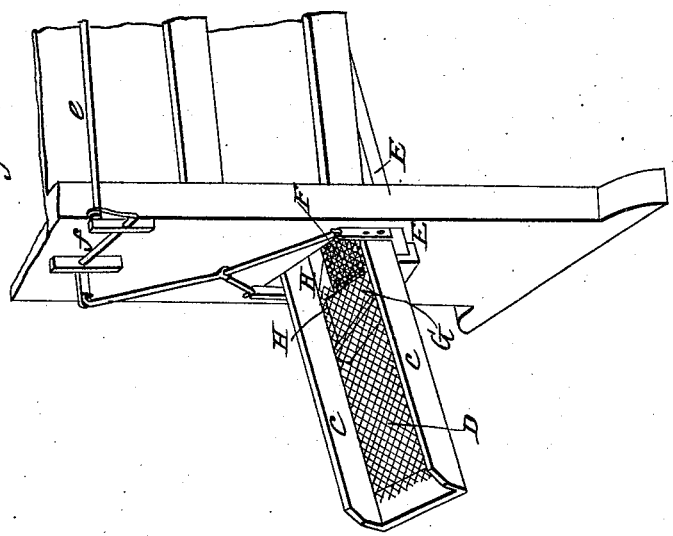
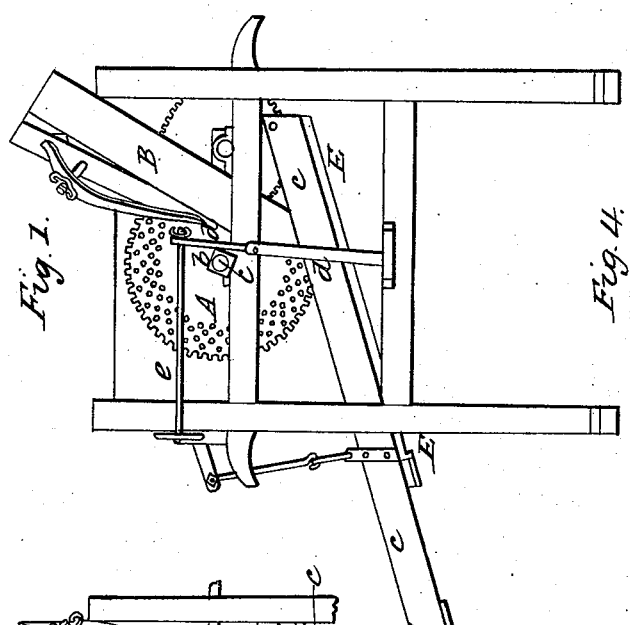
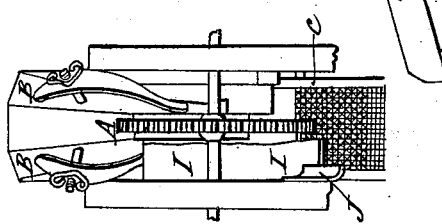
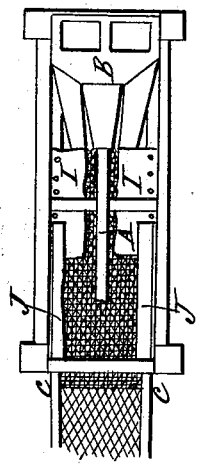

UNITED STATES PATENT OFFICE.

JAS. MURRAY, OF BALTIMORE, MARYLAND.

CORN-SHELLER.

Specification of Letters Patent No. 4,805, dated October 7, 1846.

*To all whom it may concern:*

Be it known that I, JAMES MURRAY, millwright, of the city of Baltimore, in the State of Maryland, have invented a new and useful Improvement in Machines for Shelling Corn; and I do hereby declare that the following is a full and exact description thereof.

The part of the machine by which the shelling is effected is similar to some others which are now in use, consisting of a shelling wheel revolving vertically, having teeth on each of its sides that operate on the ears of corn which are fed in vertically through feeding troughs constructed in the usual manner. With this I have combined an apparatus for separating the grain, the cobs, and the dirt or chaff, from each other without the use of a fan wheel, or other blowing apparatus. This has been heretofore attempted, but it has not been effectively accomplished, owing to the great force with which the grain cobs and chaff are projected in all directions in the rapid operation of shelling.

My improvement consists in the manner in which I combine guards of leather, or of other flexible material with the feeding troughs, and with the separator, or screen, so as to arrest the force of the flying particles, and to prevent their insinuating themselves between the vibrating screen and the body of the machine, which, if not prevented, will quickly obstruct the motion, and finally arrest it altogether.

In the accompanying drawing Figure 1, is a side elevation of the machine, the planking, or outer case, being removed for the purpose of showing the interior. Fig. 2 shows, in perspective, the manner in which I arrange and combine the feeding apparatus. Fig. 3, is a front view of the feeding troughs, B, B, of the shelling wheel, and of the leather guards, which are shown on one side only. Fig. 4 shows the interior of the machine as seen when looking down into it from above.

A, is the shelling wheel. B, B, are the feeding troughs through which the ears to be shelled are to pass.

C, is a trough or screen which is made to shake vertically, its rear end being hung on pivots, as at *a*. The bottom of this trough consists of wire work D, the meshes of which are sufficiently large to allow the shelled grain to pass through; and it is of such length as to conduct the cobs off to the distance required. Below, and attached to this trough at its upper end, is a screen, or riddle, E, the meshes of which (represented in red lines) are sufficiently small to prevent the grains of corn from passing through, but as large as they can be conveniently made to answer that purpose. This screen extends forward sufficiently far to insure the passing of the chaff and dirt through it, its lower termination is at F, Fig. 2. When the grain descends below this part it passes into a closed bottom at G, and escapes through an opening left for that purpose at H, in the side of the trough where it falls into any suitable receiver in a perfectly cleaned state; thus avoiding the labor and time required to pass it through a fan mill, or the employment of a pan in combination with the shelling machine, which would not only complicate it, but consume considerable power.

The vertical shaking I effect by allowing a square, or other suitably formed piece $b$, on the shaft $c$, to strike against an arm $d$, $d$, a rod $e$, from which rocks the shaft $f$, and this by its connection with the trough D, in the manner represented, produces the required motion.

The leather guards which I first apply consist of two broad strips of leather or of other flexible material, marked I, I, in Figs. 3, and 4. These extend up the main shaft about eight or nine inches, and their lower ends rest upon, and pass to some distance along the wire bottom of the vibrating trough C, C. These guards cover completely the opening from the feeding troughs into the interior of the machine; but from their flexibility they permit the cobs and corn to pass. They are nailed along their outer edges to the feeding troughs, and at their lower part to the edges of the screen C, to which they allow the requisite vibrating motion. Besides these guards I apply narrower ones J, J, by their upper edges to the inside of the box of the machine, a little above the upper edges of the sides of the screen, or shaking trough C, C, over which they extend, and hang down on the inner side thereof, and thereby effectually prevent the entrance of the flying matter between the screen and the case. In addition to these guards I hang an apron of leather from the upper part of the opening through which the corn and cobs are to pass from the interior of the machine. This apron extends down to the wire work D, and from side to side of the screen, but gives way freely to the passing out of the cobs.

Having thus fully described the nature of my improvement in the machine for shelling and cleaning corn, what I claim therein as new, and desire to secure by Letters Patent, is—

The employment, in the manner set forth, of the guards of leather, or other flexible material, for the purpose of preventing the escape of the corn with the cobs, and the choking of the machine by the insinuation of chaff and dirt into the moving parts thereof.

JAS. MURRAY.

Witnesses:
 THOS. P. JONES,
 EDWIN L. BRUNDAGE.